United States Patent
Chakrabarti et al.

(10) Patent No.: US 9,535,836 B2
(45) Date of Patent: Jan. 3, 2017

(54) NON-VOLATILE MEMORY UPDATE TRACKING

(71) Applicant: Hewlett-Packard Development Company, L.P., Houston, TX (US)

(72) Inventors: Dhruva Chakrabarti, San Jose, CA (US); Hans Boehm, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 370 days.

(21) Appl. No.: 13/799,290

(22) Filed: Mar. 13, 2013

(65) Prior Publication Data

US 2014/0281269 A1     Sep. 18, 2014

(51) Int. Cl.
G06F 9/30      (2006.01)
G06F 12/08     (2016.01)

(52) U.S. Cl.
CPC ........ *G06F 12/0804* (2013.01); *G06F 9/3004* (2013.01); *G06F 9/3009* (2013.01); *G06F 9/30087* (2013.01)

(58) Field of Classification Search
CPC ... G06F 9/30087; G06F 9/3004; G06F 9/3009
See application file for complete search history.

(56) References Cited

U.S. PATENT DOCUMENTS

| | | | |
|---|---|---|---|
| 7,392,302 B2 | 6/2008 | Halpern | |
| 2006/0184718 A1* | 8/2006 | Sinclair | G06F 3/0608 711/103 |
| 2009/0164738 A1 | 6/2009 | Erfani et al. | |
| 2009/0282410 A1* | 11/2009 | Moir | G06F 9/467 718/101 |
| 2012/0030408 A1* | 2/2012 | Flynn et al. | 711/102 |
| 2012/0254120 A1 | 10/2012 | Fang et al. | |
| 2012/0284459 A1 | 11/2012 | Gill | |
| 2012/0290774 A1 | 11/2012 | Trika | |
| 2012/0303737 A1 | 11/2012 | Kazar et al. | |
| 2014/0006685 A1* | 1/2014 | Peterson | G06F 12/0238 711/102 |
| 2016/0034225 A1* | 2/2016 | Yoon | G06F 12/0868 711/102 |

OTHER PUBLICATIONS

Volos, et al., "Mnemosyne: Lightweight Persistent Memory," Mar. 2011, http://research.cs.wisc.edu/sonar/papers/mnemosyne-asplos2011.pdf.

* cited by examiner

*Primary Examiner* — Edward Dudek, Jr.
(74) *Attorney, Agent, or Firm* — Trop, Pruner & Hu, P.C.

(57) ABSTRACT

A technique includes performing an update to a location of a non-volatile memory. The update is created by execution of at least one machine executable instruction of a plurality of machine executable instructions. The technique includes using a processor-based machine to selectively track the update to allow recovery of the execution to a given consistency point based at least in part on whether the machine executable instruction(s) creating the update are located within a synchronized section of the plurality of machine executable instructions.

16 Claims, 2 Drawing Sheets

NON-VOLATILE MEMORY UPDATE TRACKING

BACKGROUND

A computer system has traditionally contained both volatile and non-volatile storage devices. In this manner, due to their relatively faster access times, volatile memory devices, such as dynamic random access memory (DRAM) devices, have traditionally been used to form the working memory for the computer system. To preserve computer system data when the system is powered off, data has traditionally been stored in non-volatile mass storage devices associated with slower access times, such as magnetic media-based or optical media-based mass storage devices.

The development of relatively high density, solid state non-volatile memory technologies is closing the gap between the two technologies, and as such, non-volatile memory devices are becoming increasingly used for both traditional "memory" and "storage" functions.

DETAILED DESCRIPTION

Figure 1:
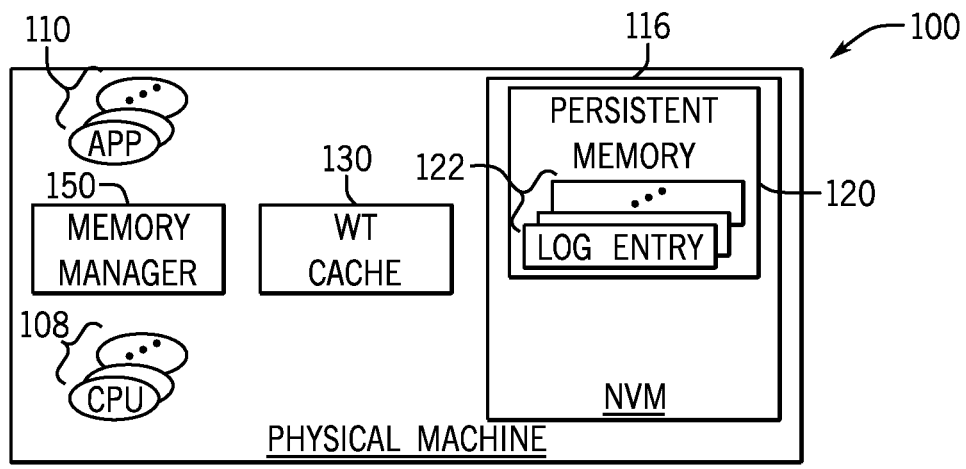
FIG. 1 is a schematic diagram of a physical machine according to an example implementation.

A computer system may contain a working, persistent memory that is formed from non-volatile memory (NVM) devices, such as memristors, phase change memory devices, spin-torque transfer random access memory (STT-RAM) devices, and so forth. Memory accesses at the byte granularity using the NVM devices along with dynamic random access memory (DRAM)-like latencies allow fine-grain and efficient persistence of data through execution of regular central processing unit (CPU) store instructions. However, data that is generated by the execution of CPU store instructions may not be immediately stored in the persistent memory. In this manner, due to caches and the presence of faults in the computing environment, challenges exist in ensuring that persistent data is consistent. In this context, a "consistent state," requires that all program invariants are met. Without a mechanism to enforce program invariants, a hardware or software failure may render persistent data incorrect and hence, unusable to applications.

Therefore, updates, or stores (or "writes") to persistent memory are tracked, or logged, for purpose of ensuring that the data that is stored in the persistent memory is consistent. However, tracking all updates to persistent memory may be expensive from memory, computational and programming standpoints. Systems and techniques are disclosed herein for selectively tracking updates to persistent memory in a manner that limits the number of updates that are tracked, while still allowing recovery to given consistency points. The limited tracking may offer such advantages as being less burdensome on the programmer/implementer and reducing the computational and memory storage expenses that may be involved with logging updates to persistent storage.

More specifically, systems and techniques are disclosed herein for purposes of tracking updates to a persistent memory based at least in part on whether the machine executable instructions associated with the updates are located within synchronized sections (an atomic section or a lock-based section, as examples) as defined by corresponding consistency constructs. In this manner, updates due to instructions that are executed within synchronized sections are tracked, and an update that is due to an instruction that is executed outside of a synchronized section is not tracked unless the data that is associated with the update depends from a nested synchronized section in another thread.

Moreover, in accordance with exemplary implementations, the selective tracking may be combined with write through caching of memory updates to persistent memory, the combination of which significantly reduces the overhead that is otherwise incurred to maintain consistent, persistent data.

It is noted that, in general, write through caching is distinctly different from write back caching, which may be used in a persistent memory computing system. With write back caching, the effect of a CPU store instruction may linger on within a volatile (i.e., a transient) structure in the memory hierarchy, such as in a store buffer or in a cache. Because cache lines may be written back to main memory at any point of time, updates may be visible in the non-volatile persistent memory out of order. At a certain point of time, the state of a data structure may therefore be split between volatile and non-volatile structures in the memory hierarchy. For purposes of ensuring that the effect of an update is visible in the non-volatile memory before another, the first update is flushed out of the cache before the second update is issued. In order to issue a cache line flush, either a programmer or implementer tracks the addresses that are the target of the store instructions and programs in cache line flushes at the appropriate points.

As compared to write back caching, using write through caching implies that a store is written to a cache line and through to system memory. An individual store in the write through cache mode may be slower than that in write back cache mode. However, the primary benefit of write through caching is that the effect of a CPU store instruction is understood to be visible in the non-volatile memory when the store completes. This implies that the programmer or the underlying implementer may not need to track as many memory accesses as in write back caching.

As a more specific example, FIG. 1 depicts a physical machine 100 in accordance with an example implementation. In general, the physical machine 100 is an actual machine that is made up of actual hardware and actual machine executable instructions, or "software." In this manner, as depicted in FIG. 1, the physical machine 100 may include hardware, such as one or more CPUs 108 and non-volatile memory (NVM) storage 116. In general, the NVM 116 storage provides a persistent memory 120 for the physical machine 100. Among its other hardware, the physical machine 100 may include a write through cache system 130 as well as other devices (input/output (I/O) devices, network interfaces devices, and so forth), as can be appreciated by the skilled artisan.

The software of the physical machine 100 may include, as examples, machine executable instructions that when executed by the CPU(s) 108 form one or more applications 110. Moreover, the physical machine 100 may also include one or more machine executable instructions, which when executed by the CPU(s) 108 form a memory manager 150. For example implementations disclosed herein, the memory manager 150 selectively tracks updates to the persistent memory 120 (as disclosed herein) for purposes of allowing recovery of program execution to a given consistency point. The memory manager 150 may be part of an operating system of the physical machine or may be separate from the operating system, depending on the particular implementation.

For the following discussion, it is assumed that a region abstraction exists to present the persistent memory 120 to the application(s) 110. The application programming interface (API) for the persistent region abstraction may be generally described as follows. A persistent region is a range of virtual addresses that are mapped to physical pages of the NVM storage 116. Each persistent region has a persistent root (within the same persistent region at a fixed offset) for the purpose of accessing the data structures within it. When a particular application 110 is executing, any data within a persistent region, which is not reachable from its persistent root or from a program root is considered garbage and may be recycled. When an application 110 crashes or when the application 110 is not executing, any data within a persistent region that is not reachable from its persistent root is considered garbage and may be recycled.

The memory manager 150 assumes the existence of consistency constructs, which convey information about the invariance of the data structures, which are maintained. For the example implementations disclosed herein, the consistency constructs define corresponding synchronized sections of program code, such as atomic sections and lock-based sections. For an atomic section, machine executable instructions that are enclosed by corresponding atomic section consistency constructs appear to execute in an indivisible manner, such that all or none of its effects are visible in the persistent memory 120, regardless of program crashes of the applications 110 and/or reboots of the physical machine 100. It is noted that similar constructs may be used in serial, multi-threaded and distributed memory applications to impose certain consistency guarantees.

In accordance with example implementations, the memory manager 150 infers consistency constructs from the machine executable instructions. For example, below is an example code segment, where a node is allocated, populated with initial data, and then added to the end of a queue q:

```
 1: struct node_t;
 ...
11: node = malloc(sizeof(node_t));
12: node->data = d;
13: node->next = 0;
14: atomic {
15: q->tail->next = node;
16: q->tail = node;
17: }
```

Example Code Segment 1

Referring to example code segment 1 above, a consistent program point may be anywhere between lines 11-13, at the beginning of the atomic consistency construct at line 14 or at the end of the atomic section construct at line 17. If a consistent point between lines 11-13 is reached and the application 110 containing the above code segment crashes, the new node may be allocated and not initialized or partially initialized. However, this is not an issue because the node is still private, is not reachable from the queue and may be garbage collected. Regardless of garbage collection, the state of the queue remains uncorrupted.

Due to the atomic section that ends at line 17, the consistent state of the code segment at line 17 must be in the persistent memory 120. This means that the effects of all changes made to persistent data in lines 11-17 have reached the persistent memory 120 at this point. This leads to publication safety, a semantic guarantee generally required in multi-threaded programs. In the presence of write back caching, the publication safety may be achieved by flushing out changes made in lines 11-17 from volatile buffers and caches. In this manner, cache line flushes may be issued for addresses, which correspond to "node->data", "node->next", "q->tail->next", and "q->tail." For these cache line flushes to occur, the system tracks these stores that exist in the original program. The stores that are tracked are both within and outside of the atomic sections. Extrapolation indicates that all stores to persistent data in the entire program have to be tracked. In multi-threaded programs, atomic sections may be relatively infrequent and small. As suggested by the example code segment 1 above, memory locations often start out as private to a thread, then get initialized and finally get published. Publishing uses atomic sections to protect mutation of shared data, as illustrated in lines 14-17 of example code segment above. Thus, relatively frequently, mutations to persistent data structures occur outside atomic sections. The write back caching mode tracks updates that occur due to execution of instructions that are both within and outside of atomic sections.

Figure 2:
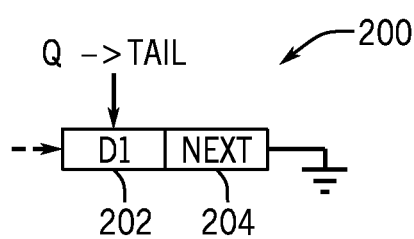
FIG. 2 is an illustration of a data structure.
Figure 3:
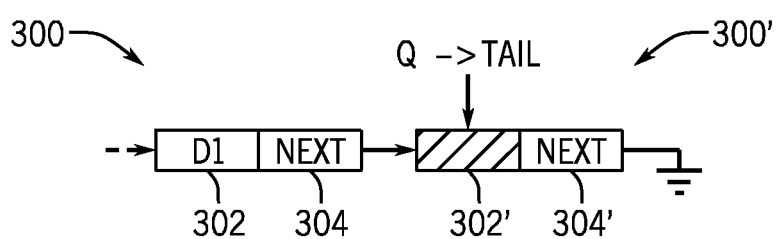
FIG. 3 is an illustration of a potential consistency error that may occur with the data structure of FIG. 2.

FIGS. 2 and 3 depict a scenario if the write in line 12 is not tracked. In this manner, if the store to the "data" field of the new node is not tracked, the corresponding update may remain in a cache, such that the cache line may not get flushed out when the atomic section commits to persistent memory. FIG. 2 illustrates how initially the q->tail pointer may point to a last node 202, having "d1" as its data. When the atomic section commits and assumes that the store to the "data" field has not made its way to persistent memory, the state of the queue may be as shown in FIG. 3. In this manner, FIG. 3 illustrates an exemplary queue 300 in which the d1 data is ideally stored in the last queue position 302. However, as indicated by shaded box 302', the data field may have garbage at this point. Therefore, if the code segment crashes at this point, the data in caches will not survive, as the data that is already in persistent memory only survives. On application restart, the persistent queue has garbage in its last node, as indicated at reference numeral 302', thereby making it corrupt and unusable. Therefore, in the write back caching mode, all stores to persistent memory are tracked and flushed as appropriate. Otherwise, applications may end up with persistent data with inconsistencies, such as wild pointers, pointers to uninitialized data, dangling pointers, and so forth.

Thus, in accordance with exemplary implementations, write through caching may be employed for updates to the persistent memory 120. Reads get the benefit of caching and no programmer-directed cache line flushes are used. Consequently, a relatively large number of writes are not tracked, as further disclosed herein.

To contrast write back and write through caching, the following example code segments may be analyzed:

```
 1: struct node_t;
 ...
11: node = malloc(sizeof(node_t));
12: node->data = d;
12a: Flush(node->data);
13: node->next = 0;
```

-continued

```
13a: Flush(node->next);
14: atomic {
14a: Log the write 15
15: q->tail->next = node;
15b: Flush(q->tail->next);
15c: Log the write 16
16: q->tail = node;
16b: Flush(q->tail);
17: }
```

Example Code Segment 2

```
1: struct node_t;
...
11: node = malloc(sizeof(node_t));
12: node->data = d;
13: node->next = 0;
14: atomic {
14a: Log ;
the write 15
15: q->tail->next = node;
15a: Log the write 16
16: q->tail = node;
16b: mfence
17: }
```

Example Code Segment 3

Example code segment 2 above employs write back caching; and example code segment 3 above employs write through caching. In both example code segments 2 and 3, the operation "log" stores the previous value of the operand in a side data structure (such as a log entry 122 of FIG. 1); and in the event of a crash/recovery, the operand is reverted to the previous value stored in the log. Code required to commit or roll back the atomic section is elided. The operation "flush" in example code segment 2 refers to a sequence of a memory fence operation, a cache line flush that contains the operand, and a subsequent memory fence operation.

Lines 14-17 for example code segments 2 and 3 set forth a corresponding atomic section that guarantees all-or-nothing behavior. Therefore, updates inside the atomic section are tracked so as to retain the ability to roll back the effects of an incomplete atomic section in the event of a crash. This tracking is employed, regardless of whether write through caching or write back caching is employed. It is noted that with write through caching, a single memory fence operation at the commit point of the atomic section in line 17 of example code segment 3 is sufficient to ensure publication safety when all persistent stores use the write through mode of caching. The memory fence ensures that all stores before line 16b have completed. The memory fence further ensures that a write combining buffer, if used in the write through mode, is empty at that point. Thus, a difference between write back and write through is that in the former, updates outside an atomic section are tracked so as to flush the relevant addresses while in the latter, the updates are not tracked for flushing purposes.

Tracking memory accesses serves another purpose: a way to roll back the persistent state to one that was seen at a particular point in a set of machine executable instructions. For example, in write back caching mode of example code segment 2, all operations in lines 11-17 are tracked, and this tracking may include logging the previous value being overwritten by the current update. If the program crashes, the consistent points to which the implementation may roll back correspond to lines 11, 12, 13, 14, and 17 of example code segment 2. It is noted that the program points at lines 15 and 16 are not consistent, because these instructions are in the middle of an atomic section (i.e., the start and end points of an atomic section are consistent points). As previously set forth by the example in connection with FIGS. 2 and 3, the failure to track the write on line 12 of example code segment 2 may result in a corrupt queue. Moreover, not tracking the write associated with line 12 may also result in losing the ability to undo the corresponding update. In this case, this implies that the system may not be able to revert to the state corresponding to the beginning of line 12 if a crash occurs after line 12.

The following is an example of a "corner case" inconsistency situation, which may arise from losing the ability to roll back the state of data structures to an arbitrary program point. This corner case may occur for write back as well as write through caching implementations. To illustrate this problem, example code segments 4 and 5 are set forth below:

```
Initially data = 0, flag = false;
1: atomic
2: flag = true;
3: }
4: data = 1;
5: atomic {
6: flag = false;
7: data = 0;
8: }
```

Example Code Segment 4

```
Initially data = 0, flag = false;
1: lock(I);
2: flag = true;
3: unlock(I);
4: data = 1;
5: lock(I);
6: flag = false;
7: data = 0;
8: unlock(I);
```

Example Code Segment 5

It is noted that example code segment 4 illustrates an atomic section; and example code segment 5 illustrates a lock-based section. For write back caching, all stores to persistent locations are tracked. With write through caching, for the following example, it is assumed that the store to data in line 4 of example code segment 4 is not tracked. If the program, for this example, crashes after executing line 4 and the recovery phase reverts the state at line 1, the value of "flag" is rolled back to "false" due to the update to "flag" in line 2 being logged. However, the value of "data" remains "1," because the update to "data" in line 4 is not logged. The problem is that "flag=false, data=1" is an inconsistent state, which may not be obtained in a failure-free operation. This is similar to the classical "shorn write" error situation where only some of the updates are seen.

The above-described situation may be avoided by noting that in the example code segment 4, there is no need to revert to the state in line 1 because there is no need to roll back beyond the commit point of an atomic section if that commit completed successfully.

The lock-based construct of example code segment 5, however, is slightly more complicated. The lock-based synchronized section has a relatively more complex "happens-before" relation between threads, as there is no explicit commit point and the recovery phase may be forced to revert to the consistency point on line 1. Thus, the inconsistent state set forth for the example code segment 4 above may indeed happen. To prevent such an occurrence, the following conditions may be imposed to determine whether tracking of updates to persistent locations outside of consistency constructs may be eliminated.

In particular, in accordance with example implementations, each time execution reaches a consistent point, the memory manager 150 removes all log entries up to that program point. The core idea is not to roll back beyond an untracked persistent location update. Therefore, when an update to a persistent location outside a synchronized section is encountered, the memory manager 150 determines whether the executing thread has any existing log entry. If so, the memory manager 150 infers that a roll back to an earlier point may happen during recovery; and therefore, the memory manager 150 tracks the update under consideration. If the memory manager 150 determines that that there is no log entry, then the memory manager 150 does not track the update under consideration. With atomic sections, the removal of log entries on commit ensures that the condition always holds so that updates outside of atomic sections are not tracked.

In other words, in accordance with example implementations, the memory manager 150 logs, or tracks, updates that occur within synchronized sections. For an update that is outside of a synchronized section, the memory manager 150 does not track the update unless it depends on an update within a nested synchronized section of another thread.

In accordance with example implementations, the memory manager 150 may include a counter, which the memory manager 150 increments each time a lock is acquired and decrements the counter every time a lock is released. In this manner, a counter value of zero indicates that execution is outside of the synchronized section. If the log that is maintained by the executing entity is empty at that point, the memory manager 150 eliminates all tracking until the counter becomes non-zero. Other implementations are contemplated, which are within the scope of the appended claims.

Figure 4:
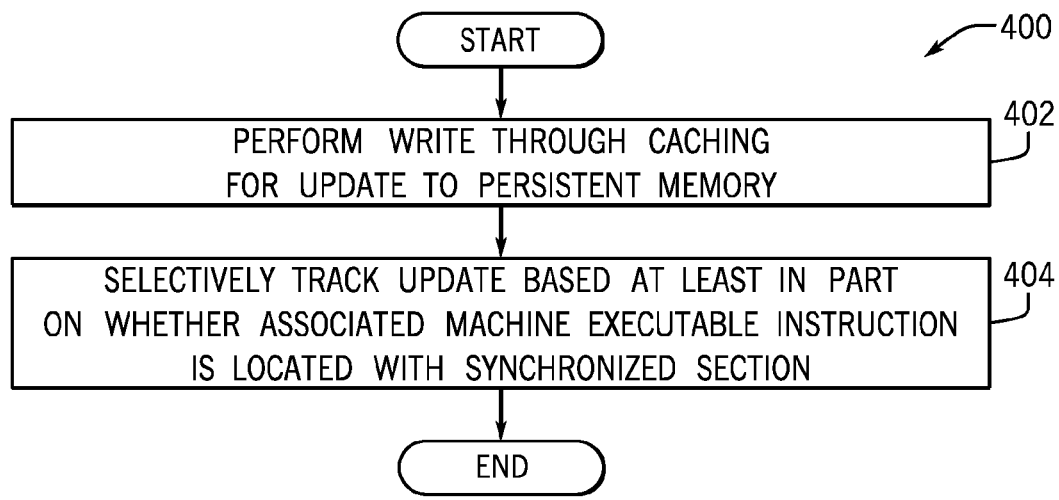
FIGS. 4 and 5 are flow charts depicting exemplary techniques to track updates to persistent memory according to example implementations.

Thus, referring to FIG. 4, in accordance with example implementations, a technique 400 includes performing (block 402) write through caching for an update to persistent memory. The technique 400 includes selectively tracking (block 404) the update based at least in part on whether associated machine executable instruction(s) are located within a synchronized section.

Figure 5:
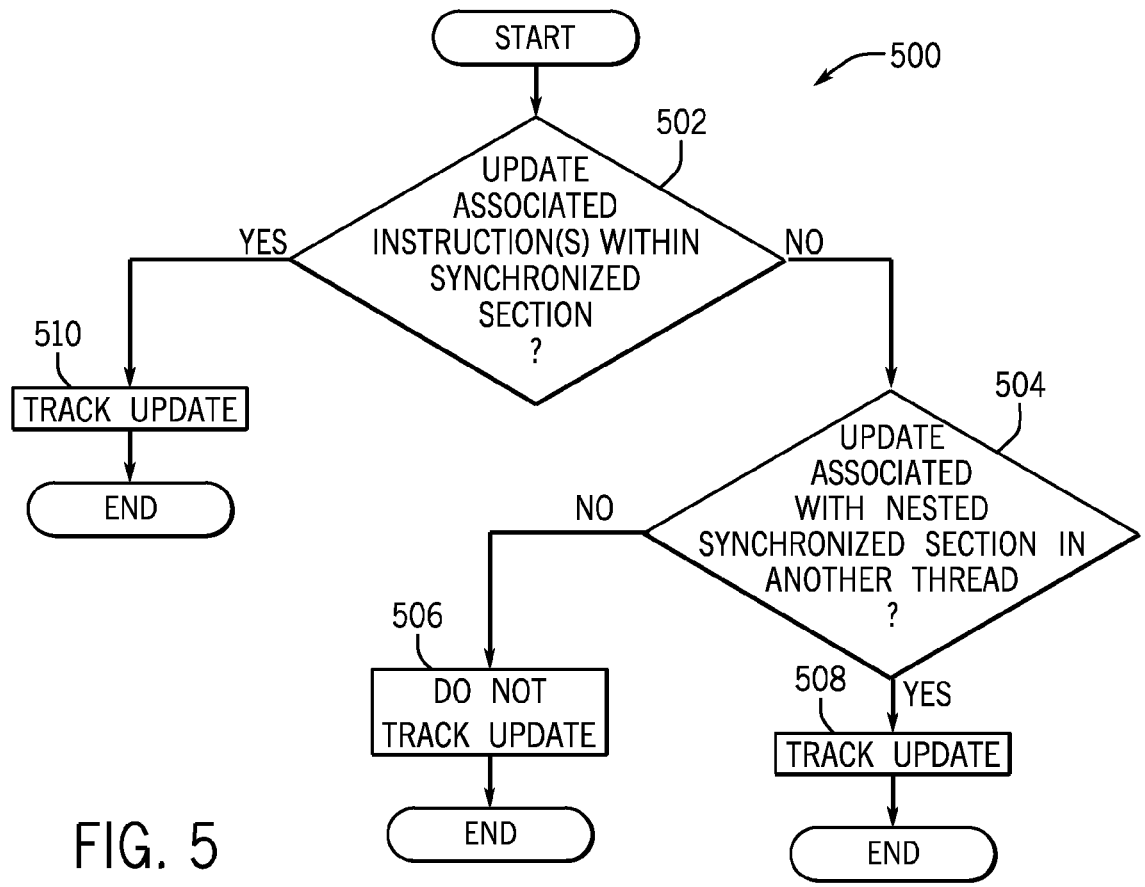

As a more specific example, FIG. 5 depicts an exemplary technique 500. Pursuant to the technique 500, the memory manager 150 determines (decision block 502) whether an update associated with one or multiple instructions is associated with a synchronized section of the current thread. If so, the memory manager 150 tracks the update, pursuant to block 510. Otherwise, if the update is not associated with instructions within a synchronized section of the current thread, the memory manager 150 determines (decision block 504) whether the update is associated with a nested synchronized section is another thread. If so, the memory manager 150 tracks the update, pursuant to block 508. Otherwise, the memory manager 150 does not track the update, pursuant to block 506.

As another example, the memory manager 150 may perform the following tracking, in accordance with an example implementation. If a thread T1 reads a value within a synchronized section cs1 from a location last written before or within a nested synchronized section cs2 executed by another thread T2, then the memory manager 150 logs any instruction executed outside a synchronized section by T1 subsequent to cs1 unless it can be proved that the dynamically executed outermost synchronized section within which cs2 is enclosed will not be rolled back. This ensures that cs1 will not be rolled back and hence the instruction executed outside a synchronized section by T1 subsequent to cs1 will not be rolled back either and hence it does not have to be logged.

For every lock L1 to Ln, the memory manager 150 maintains a counter C1 to Cn. These counters are shared across threads. Counters track the number of times each lock has been released.

The memory manager 150 uses a hash table HT that maps a lock to a log entry. On a release of lock L, the log entry corresponding to the release is installed in HT. On an acquire of lock L, the memory manager 150 queries the HT hash table with L and if an existing entry is found, a happens-after edge is added from the acquire-log-entry to the found release-log-entry. The following augments the HT hash table to help determine whether an update dynamically outside a critical section needs to be logged.

Assuming that lockinfo is a type containing a lock address and its counter type, the hash table entry is augmented to contain a set of elements of type lockinfo along with other existing information.

The memory manager 150 maintains a thread local data structure called "local set tld_roll_back_locks," where every element is of type "lockinfo." The set is a union of the locks held by the current thread and other locks potentially held by other threads. If any of the synchronized sections corresponding to the latter fails, the current synchronized section of this thread is rolled back.

Just before a lock Li is released, the following is performed. <Li, Ci> is removed from tld_roll_back_locks. Optionally, tld_roll_back_locks is traversed and a check is performed to verify whether any of the counters has increased. If so, that element is removed from tld_roll_ back_ locks. The log entry corresponding to the release instruction is installed. Additionally, install tld_roll_back_ locks into HT for lock Li. Immediately after acquiring a lock Li, the following is performed. Ci is incremented. tld_roll_ back_locks is then set equal to <Li, Ci> U tld_roll_ back_ locks U get_global_roll_back_locks(Li), where U denotes set_union and get_global_roll_back_locks(Li) queries HT with Li and obtains the list from HT.

Given the above protocol, the following holds at any program point. If, for all elements in tld_roll_back_locks, the shared counter value is greater than the value found in tld_roll_back_locks, the instruction executed at that program point is not within a synchronized section and does not depend on any data written within a synchronized section that can be rolled back. If this condition holds, this instruction is not logged. Whenever tld_roll_back_locks is traversed and its elements checked, any element, for which its counter value has increased, can be removed.

Thus, as disclosed herein, persistent memory accesses outside synchronized sections may not have to be tracked; and persistent memory accesses inside synchronized sections are tracked. The reduction of tracking has been disclosed herein in a way that preserves the underlying system's capability to recover from failure. The elimination of tracking outside of synchronized sections may improve programmability, especially when incorporating existing code. Depending on the specific API, either significantly less work would be required of the programmer or if the mechanism described herein is used by the underlying implementation, its complexity may be reduced. Tracking memory accesses may involve logging and may generally, be computationally expensive. In this manner, more tracking implies a larger log and consequently higher memory consumption. Reduction of tracking may improve application performance because of these reasons.

Even if logging can be eliminated outside synchronized sections, updates to non-volatile memory outside synchronized sections are flushed out of caches if write-back caching mode is used; but, no cache line flushes are used for write through, in accordance with example implementations. Therefore, using write through caching as described herein, may be a large differentiator as a lot of data structure updates appear outside of synchronized sections.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   performing an update to a location of a non-volatile memory, the non-volatile memory accessible at a byte level granularity via central processing unit store instructions, the update created by execution of at least one machine executable instruction of a plurality of machine executable instructions; and
   using a processor-based machine to selectively track the update to allow recovery of the execution to a given consistency point based at least in part on whether the at least one machine executable instruction is located within a synchronized section of the plurality of machine executable instructions, wherein the synchronized section comprises multiple instructions of the plurality of machine executable instructions, wherein the synchronized section comprises a lock-based section, wherein using the processor-based machine to selectively track the update is based at least in part on a determination of whether the update can be rolled back, wherein the update is outside of the synchronized section, and determining whether the update can be rolled back comprises:
   determining whether another synchronized section is executed before the synchronized section comprising the lock-based section can be rolled back.

2. The method of claim 1, wherein:
   the synchronized section comprises an atomic section; and
   using the processor to selectively track the update comprises tracking the update if the at least one machine executable instruction is located within the atomic section and not track the update if the at least one machine executable instruction is located outside of the atomic section.

3. The method of claim 1, wherein using the processor to selectively track the update is based at least in part on non-volatile logging updates, wherein the updated location and a log generated by the logging are stored in non-volatile memory.

4. The method of claim 1, wherein using the processor to selectively track the update comprises selectively deleting log entries in response to determination of a consistent state and determining whether an executing entity can be rolled back by checking whether any log entry exists in the plurality of machine executable instructions at a point where an update is made to a location in non-volatile memory.

5. The method of claim 1, wherein wherein determining whether the update can be rolled back further comprises:
   determining whether execution of another synchronized section that occurs before the synchronized section comprising the lock-based section has completed.

6. The method of claim 1, further comprising using write through caching to reduce a degree of tracking of updates to the non-volatile memory.

7. The method of claim 1, wherein the synchronized section is delimited by programming constructs.

8. The method of claim 1, wherein using the processor-based machine to selectively track the update comprises:
   determining whether the update is located within the synchronized section; and
   selectively tracking the update based on the determination.

9. A system comprising:
   a non-volatile memory, the non-volatile memory accessible at a byte level granularity via central processing unit store instructions;
   a write through cache;
   a processor to use the write through cache to update a location of the non-volatile memory in response to execution of at least one machine executable instruction of a plurality of machine executable instructions; and
   a memory manager to selectively track the update to allow recovery of the execution to a given consistency point based at least in part on whether the at least one machine executable instruction is located within a synchronized section of the plurality of machine executable instructions, wherein the synchronized section comprises multiple instructions of the plurality of machine executable instructions, wherein the synchronized section comprises an atomic section, wherein the processor is adapted to track the update if the at least one machine executable instruction is located within the section and selectively track the update if the at least one machine executable instruction is located outside of the atomic section.

10. The system of claim 9, wherein the persistent memory comprises a non-volatile memory, and the processor comprises a central processing unit.

11. The system of claim 9, wherein the processor is adapted to
   selectively track the update based at least in part on logging updates stored in non-volatile memory, wherein the selectively tracked update and the logging updates are stored in non-volatile memory.

12. The system of claim 9, wherein the processor is adapted to selectively track the update based at least in part on a determination of whether the update can be rolled back.

13. The system of claim 12, wherein the update is outside of the synchronized section, and the processor is adapted to determine whether the update can be rolled back by selectively tracking the update based at least in part on whether execution of another synchronized section occurs before the synchronized section of the plurality of machine executable instructions.

14. An article comprising a non-transitory storage medium to store instructions readable by a processor-based machine which when executed by the processor-based machine cause the processor-based machine to:

perform write through caching for an update to a location of a non-volatile memory, the non-volatile memory accessible at a byte level granularity via central processing unit store instructions, the update created by execution of at least one machine executable instruction of a plurality of machine executable instructions association with an application; and selectively track the update to allow recovery of the execution to a given consistency point based at least in part on whether the at least one machine executable instruction is located within a synchronized section of the plurality of machine executable instructions, wherein the synchronized section comprises multiple instructions of the plurality of machine executable instructions, wherein the synchronized section comprises a lock-based section, the storage medium storing instructions that when executed by the processor-based machine cause the processor-based machine to selectively track the update based at least in part on whether the update can be rolled back, wherein the update is outside of the synchronized section, and the storage medium storing instructions that when executed by the processor-based machine cause the processor-based machine to determine whether the update can be rolled back based at least in part on a determination of whether another synchronized section that is executed before the synchronized section of the plurality of machine executable instructions can be rolled back.

15. The article of claim 14, wherein the synchronized section comprises an atomic section, the storage medium storing instructions that when executed by the processor-based machine cause the processor-based machine to selectively track the update based on whether the update is located within the atomic section.

16. The article of claim 14, the storage medium storing instructions that when executed by the processor-based machine cause the processor-based machine to selectively track the update based at least in part on a log, wherein the log and the update are stored in non-volatile memory.

* * * * *